United States Patent
McCormick et al.

(10) Patent No.: US 9,444,766 B2
(45) Date of Patent: Sep. 13, 2016

(54) IDENTIFYING A PORT ASSOCIATED WITH A NETWORK NODE TO WHICH A SELECTED NETWORK LINK IS CONNECTED

(71) Applicant: International Business Machines Corporation, Armonk, NY (US)

(72) Inventors: Timothy McCormick, Hursley (GB); Alexander D. Mirski-Fitton, Hursley (GB); Edwin P. Moffatt, Hursley (GB); Ross B. Pavitt, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 13/957,756

(22) Filed: Aug. 2, 2013

(65) Prior Publication Data

US 2014/0036920 A1   Feb. 6, 2014

(51) Int. Cl.
*H04L 12/947* (2013.01)
*H04L 12/24* (2006.01)

(52) U.S. Cl.
CPC .............. *H04L 49/25* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 5,926,111 A * | 7/1999 | Davis et al. | 340/12.16 |
| 6,577,243 B1 | 6/2003 | Dannenmann et al. | |
| 6,681,248 B1 * | 1/2004 | Sears et al. | 709/223 |
| 6,968,994 B1 | 11/2005 | Smith | |
| 7,170,393 B2 | 1/2007 | Martin | |
| 7,684,416 B2 | 3/2010 | Galin et al. | |
| 7,970,013 B2 * | 6/2011 | Sinha et al. | 370/470 |
| 2003/0020976 A1 * | 1/2003 | Krishnaswamy et al. | 359/110 |
| 2003/0169718 A1 * | 9/2003 | Hirata et al. | 370/338 |
| 2004/0103282 A1 * | 5/2004 | Meier et al. | 713/171 |
| 2007/0076632 A1 | 4/2007 | Ghamami | |
| 2007/0283045 A1 | 12/2007 | Nguyen et al. | |
| 2008/0219184 A1 | 9/2008 | Fowler et al. | |
| 2009/0322487 A1 | 12/2009 | Lange et al. | |
| 2012/0281686 A1 * | 11/2012 | Pollari | 370/338 |
| 2013/0124721 A1 * | 5/2013 | Prasadam et al. | 709/224 |
| 2013/0128751 A1 * | 5/2013 | Keesara et al. | 370/248 |

FOREIGN PATENT DOCUMENTS

WO    WO0180596 A1    10/2001

OTHER PUBLICATIONS

Finn, "Port Aggregation Protocol," Cisco Systems, Inc., May 1, 1998.

\* cited by examiner

*Primary Examiner* — Hicham Foud
(74) *Attorney, Agent, or Firm* — Convergent Law Group LLP

(57) ABSTRACT

Exemplary embodiments for use in a communications source network node for identifying a destination port associated with a destination network node to which a selected network link is connected. The embodiments include receiving a communications protocol packet at a destination network node via said selected network link connected to the destination port associated with the destination network node; inspecting the packet for a predetermined identifier; and if the predetermined identifier is present in said packet then outputting an indication that the identifier has been received comprising an identification of the destination port via which the packet was received. The indication is output by at least one of illumination for a pre-set period of a destination switch associated with the destination port, and by an output provided via a user interface of a network interface controller associated with the destination port.

14 Claims, 4 Drawing Sheets

IDENTIFYING A PORT ASSOCIATED WITH A NETWORK NODE TO WHICH A SELECTED NETWORK LINK IS CONNECTED

CROSS-REFERENCE TO RELATED APPLICATIONS

This application claims the benefit under 35 U.S.C. 119 of Patent Application No. GB1213768.3, filed Aug. 2, 2012, assigned to the assignee of the present application, and incorporated herein by reference.

FIELD OF INVENTION

The present invention relates to identifying a port associated with a network node to which a selected network link is connected.

BACKGROUND

Computer networks comprise network nodes interconnected by network links commonly provided by network cables such as Ethernet cables or Fibre Channel cables. When performing maintenance on such systems, it is often desirable to determine the physical destination of a cable from its physical origin. In other words, users need to locate the other end of a cable is that is plugged into a given network node. Such a cable may be unconnected or plugged into another network node. Without physically tracing a cable, which may be difficult and error prone, the cable destination may be difficult to accurately identify. For example, cables may be poorly organised in a rack of network equipment or run in obscured under-floor or overhead conduits.

A known method for identifying the destination of a cable comprises attaching an electronic noise transmitter at one end of a selected cable and scanning the ends of candidate cables with a noise detection device to attempt to identify the other end of the selected cable. This method generally requires the disconnection of the cable being analysed and the selection of a group of candidate cables for scanning. There is no guarantee that the selected group of candidate cables includes the cable of interest.

Specialised cables can be provided comprising means for transmitting an introduced light signal along the cable. A light signal device is attached to one end of a given cable and the cable emits the light along the cable, identifying the route of the cable and its destination. However, for a user to see the light emitted from the cable, the user must know where to look. If the cable runs out of sight under a floor or into a conduit, the location process may be hindered and thus slowed.

BRIEF SUMMARY OF THE INVENTION

An embodiment of the invention provides a method for use in a communications network node for identifying a port associated with the network node to which a selected network link is connected, the method comprising: receiving a communications protocol packet at a first network node via a network link connected to a port associated with the network node; inspecting the packet for a predetermined identifier; and if the predetermined identifier is present in the packet then outputting an indication that the identifier has been received comprising an identification of the port via which the packet was received.

Data representing the indication may be recorded in a log file. The indication may comprise a visual signal associated with the port. The indication may comprise an audible signal associated with the network node. The communications protocol may comprise a data link layer protocol and the packet may comprise a frame. The communications protocol may comprise a link layer protocol. The network node may be arranged to broadcast the received packet to each other adjacent network node and to omit the outputting of the indication. The packet may comprise data arranged to determine the number of times the packet may be broadcast. The method may comprise: identifying a network port on a second network node; creating the communications protocol packet comprising the predetermined identifier for transmission via the port; and transmitting the packet via the identified port so as to enable the adjacent first network node linked to the identified port to output the identification.

Another embodiment provides a method for use in a first communications network node for identifying a port associated with the first network node connected to an adjacent second network node, the method comprising: identifying a network port on the first network node; creating a communications protocol packet comprising the predetermined identifier, for transmission via the port; and transmitting the packet via the identified port so as to enable the adjacent second network node linked to the identified port, in response to the identification of the predetermined identifier in the packet, to provide an identification of the port associated with the adjacent second network node via which the packet was received.

A further embodiment provides apparatus for use in a communications network node for identifying a port associated with the network node to which a selected network link is connected, the apparatus being operable to: receive a communications protocol packet at a first network node via a network link connected to a port associated with the network node; inspect the packet for a predetermined identifier; and if the predetermined identifier is present in the packet then output an indication that the identifier has been received comprising an identification of the port via which the packet was received.

Another embodiment provides apparatus for use in a first communications network node for identifying a port associated with the first network node connected to an adjacent second network node, the apparatus being operable to: identify a network port on the first network node; create a communications protocol packet comprising the predetermined identifier, for transmission via the port; and transmit the packet via the identified port so as to enable the adjacent second network node linked to the identified port, in response to the identification of the predetermined identifier in the packet, to provide an identification of the port associated with the adjacent second network node via which the packet was received.

A further embodiment provides a computer program product for use in a communications network node for identifying a port associated with the network node to which a selected network link is connected, the computer program product comprising a computer-readable storage medium having computer-readable program code embodied therewith, the computer-readable program code being configured to: receive a communications protocol packet at a first network node via a network link connected to a port associated with the network node; inspect the packet for a predetermined identifier; and if the predetermined identifier is present in the packet then output an indication that the identifier has been received comprising an identification of the port via which the packet was received.

Another embodiment provides a computer program product for use in a first communications network node for identifying a port associated with the first network node connected to an adjacent second network node, the computer program product comprising a computer-readable storage medium having computer-readable program code embodied therewith, the computer-readable program code being configured to: identify a network port on the first network node; create a communications protocol packet comprising the predetermined identifier, for transmission via the port; and transmit the packet via the identified port so as to enable the adjacent second network node linked to the identified port, in response to the identification of the predetermined identifier in the packet, to provide an identification of the port associated with the adjacent second network node via which the packet was received.

Embodiments of the invention enable one end of a physical network link connected to a first network node to be automatically identified from the other end of the physical network link without disconnecting the physical link.

BRIEF DESCRIPTION OF THE DRAWINGS

Preferred embodiments of the invention will now be described, by way of example only, with reference to the following drawings in which.

DETAILED DESCRIPTION OF THE EMBODIMENTS

Figure 1:
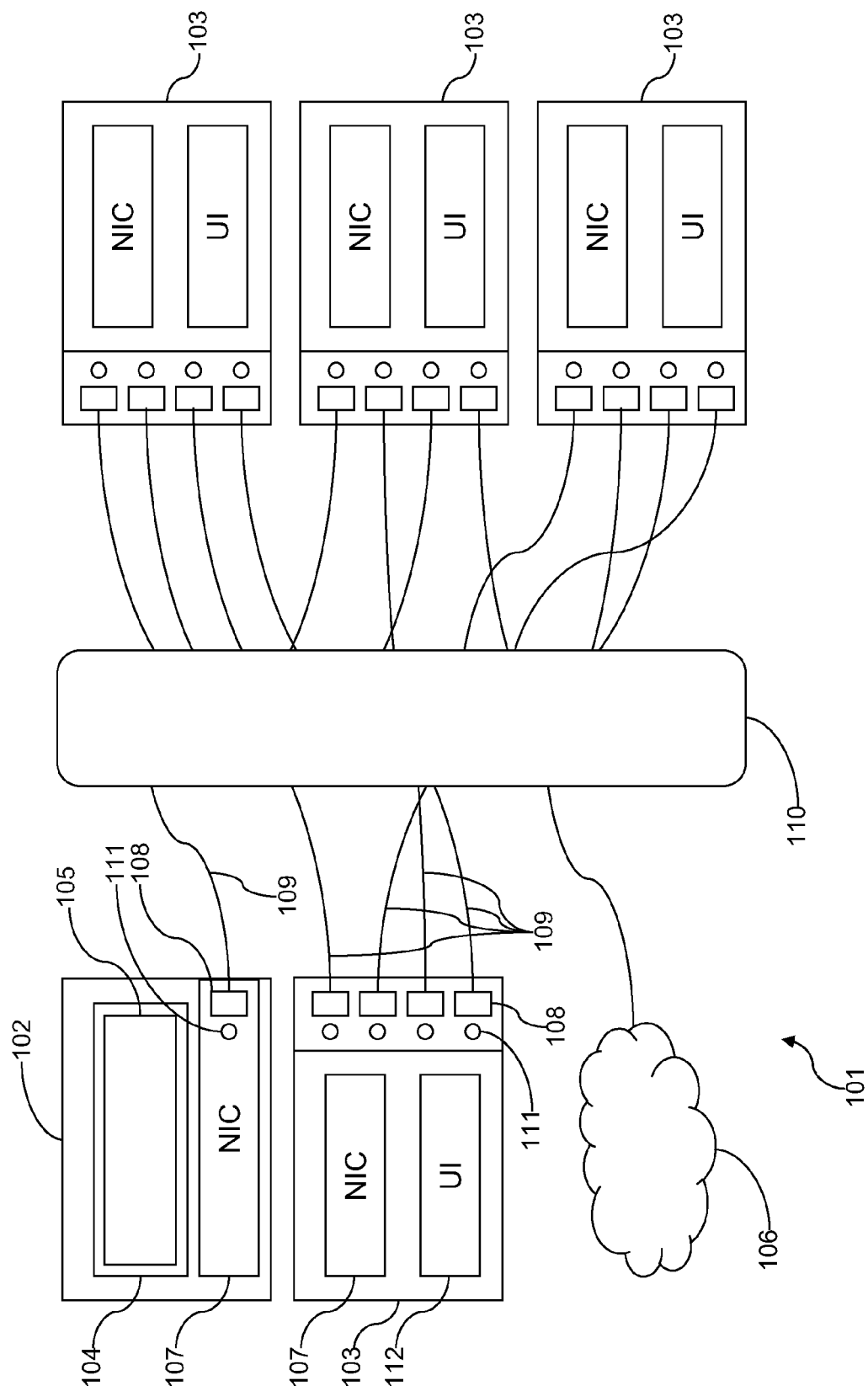
FIG. 1 is a schematic illustration of a communications network comprising network nodes interconnected by links in the form of cables.

With reference to FIG. 1, a computer system 101 comprises a computer 102 and four storage devices 103. The computer 102 is loaded with an operating system 104 arranged to provide a processing platform for one or more application programs. In the present embodiment, the computer 102 is running a storage area network (SAN) controller application program 105. The SAN controller 105 is arranged utilise the storage provided by each of the storage devices 103 to create a homogenous storage facility in the form of a storage area network (SAN). The computer 103 is also connected to a network 106 to enable other computers (not shown) on the network 106 to access the SAN. Each of the devices 102, 103 in the computer system 101 provides a network node and comprises a network interface controller (NIC) module 107 associated with one or more physical network ports 108. The physical ports 108 provide connection points for network links in the form of cables 109 for networking the devices 102, 103 in the computer system 101. The cables 109 are run for a portion of their length within a conduit 110 arranged to house and protect the cables 109 as they run between the physically separated devices 102, 103 in the computer system 101. In the present embodiment, each port 108 is associated with an adjacent user operable illuminable switch 111 arranged to enable a user to provide an input to the NIC 107 for the relevant port 108. The switch 111 may be illuminated under the control of the relevant NIC 107. Each of the storage devices 103 further comprises a user interface 112, in the form of a command line interface (CLI), enabling user interaction with the relevant device 103.

In the present embodiment, the NICs 107 in each of the devices 102, 103 are arranged to enable a user to automatically identify a port 108 associated with a given network node such as another one of the devices 102, 103, between which a network link 109 is connected. In other words, the NICs 107 are arranged to enable a user to identify the destination device 102, 103 of a selected cable 109 plugged into a given source device 102, 103 by providing a relevant input at the source device 102, 103. In the present embodiment, the user can select a port 108 for interrogation as to the destination of a connected cable 109 either via a predetermined command input via the CLI of the UI 112 or by operation of the switch 111 associated with the relevant port 108. The command input to the UI 112 comprises the interrogation command and an identification of the selected port 108. In response to such an input, the NIC 107 is arranged to transmit a predetermined signal via the connected cable 109 to the adjacent network node 102, 103, that is, to the device 102, 103 into which the other end of the relevant cable 109 is connected. The predetermined signal is referred to herein as a Physical Port Discovery (PPD) signal.

The NIC 107 in the adjacent network node 102, 103 is arranged to detect the received PPD signal and to output an indication of the receipt of the signal and an identification of the port 108 on which the signal was received. Thus the destination network node 102, 103 to which one end of a selected cable 109 is attached is automatically indicated in response to user input at the source network node 102, 103 to which the other end of the selected cable 108 is attached. In the present embodiment, the indication is output in the form of illumination for a pre-set period of the switch 111 associated with the port 108 to which the selected cable 108 is attached or by an output provided via the UI 112.

Figure 2:
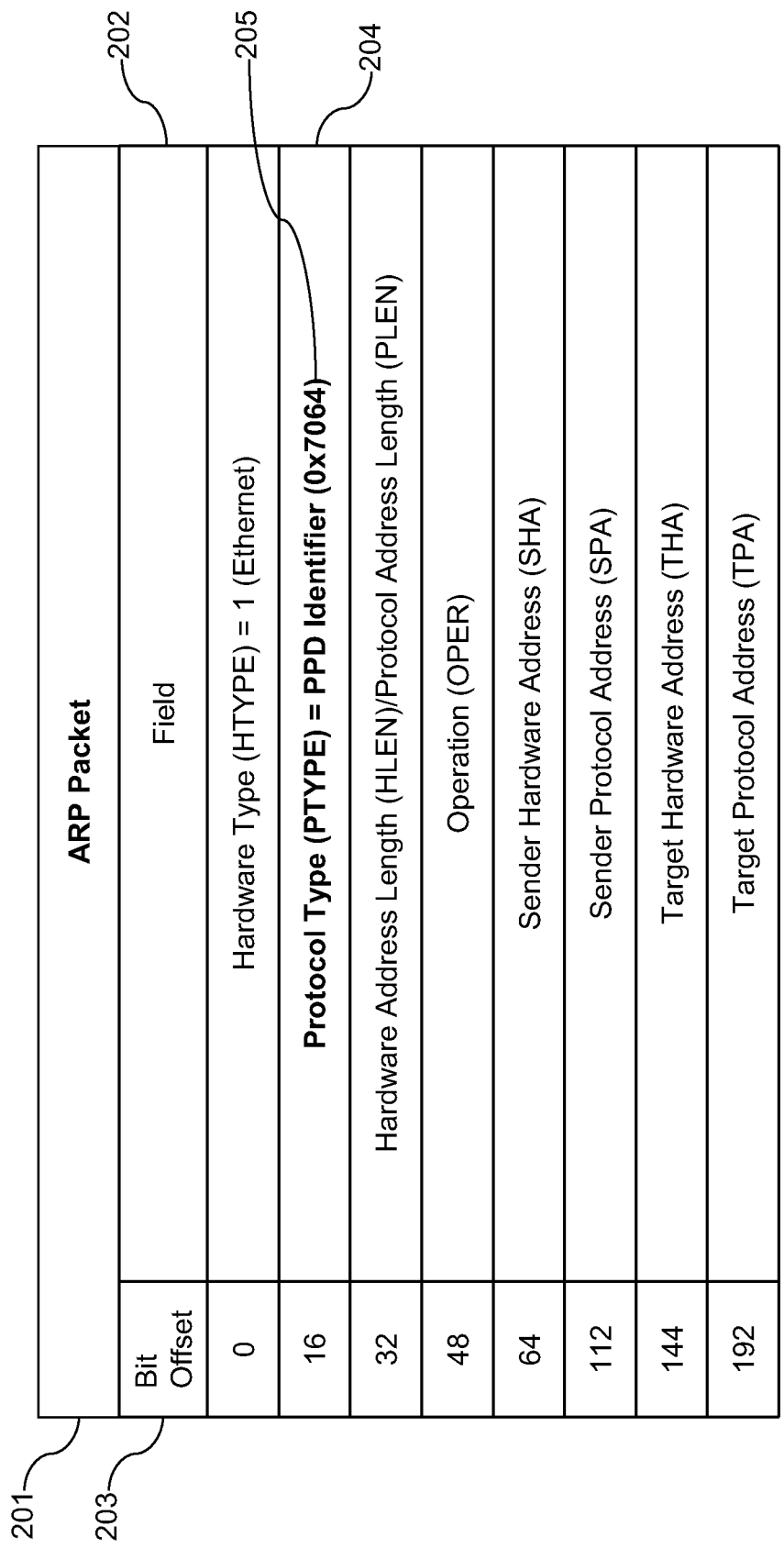
FIG. 2 is a table illustrating the structure of a communications network protocol packet transmitted between the network nodes of FIG. 1.

In the present embodiment, the NICs 107 are arranged to provide an Internet Protocol (IP) network, also known as a Transmission Control Protocol/Internet Protocol (TCP/IP) network, with an Ethernet link layer. The PPD signal is communicated between adjacent network nodes 102, 103 at the link layer, that is, at the data link layer in accordance with the Open Systems Interconnection (OSI) model. In the present embodiment, the link layer protocol is the Address Resolution Protocol (ARP). With reference to FIG. 2, an ARP packet 201 comprises a predetermined set of fields 202 each having a predetermined function. Each field has a prescribed size range and is identified within the ARP packet 201 via a bit offset 203. The second field 204 of an ARP packet is provided for defining the network protocol type in use, that encapsulates the ARP protocol. In the present embodiment, the ARP is encapsulated by the IPv4 network protocol running over the Ethernet links 109. In other words, each ARP packet is encapsulated in an Ethernet frame. A predetermined set of permitted PTYPE values are defined for the ARP. In the present embodiment, the predetermined set of permitted PTYPEs is augmented with a further PTYPE value referred to herein as a Physical Port Discovery (PPD) identifier 205. In the present embodiment, the PPD identifier 205 has the hexadecimal value "0x7064". In the present embodiment, an ARP packet 201 carrying the PPD identifier 205 comprises the PPD signal.

In response to user interrogation of a given port 108 via a CLI command or operation of the associated switch 111, the NIC 107 is arranged to create and transmit an ARP packet 201 carrying the PPD identifier 205 from the selected port 108. The ARP packet 201 is transmitted at the link layer to the adjacent network node 102, 103 to which the cable attached to the selected port 108 is connected. The NIC 107 at the adjacent port 108 is arranged to identify the received ARP packet 201 and, in response to the PPD identifier 205, output a predetermined indication or signal identifying the port 108 on which the ARP packet 201 was received. In the present embodiment, once an ARP packet 201 comprising a PPD identifier 205 has been received and the predetermined indication provided, the ARP packet 201 is consumed by the receiving network node 102, 103.

Figure 3:
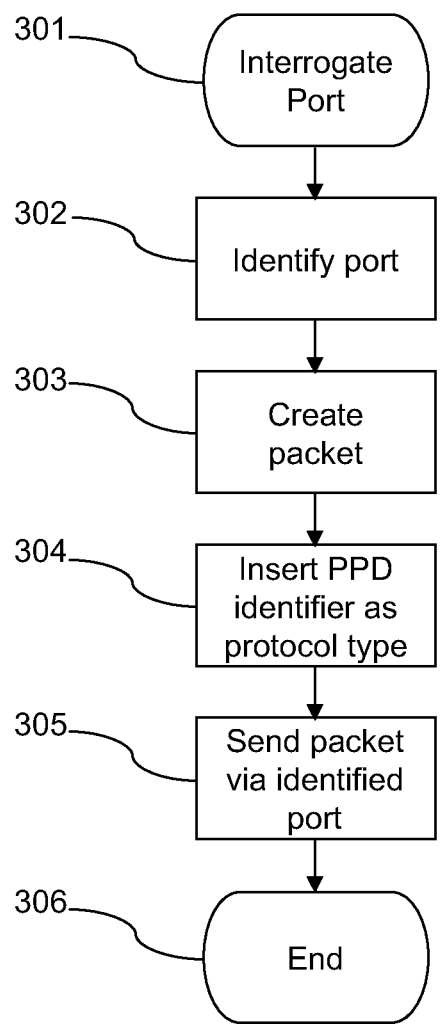
FIG. 3 is a flow chart illustrating the processing performed by a network node of FIG. 1 when producing and sending a packet according to FIG. 2.

The processing performed by a NIC 107 in response to user interrogation of a selected port 108 of a network node 102, 103 will now be described with reference to the flow chart of FIG. 3. Processing is initiated at step 301 in response to the interrogation of a port 108 associated with the NIC 107 by a user either, in the present embodiment, via a CLI input or operation of the relevant switch 111 and processing moves to step 302. At step 302 the port 108 associated with the interrogation request is identified within the NIC 107 and processing moves to step 303. At step 303 an ARP packet 201 is created and processing moves to step 304. At step 304 the PPD identifier 205 is inserted as the protocol type (PTYPE) 204 of the ARP packet 201 and processing moves to step 305. At step 305 the ARP packet is sent via the identified port 108 to the connected adjacent network node 102, 103. Processing then moves to step 306 and ends.

Figure 4:
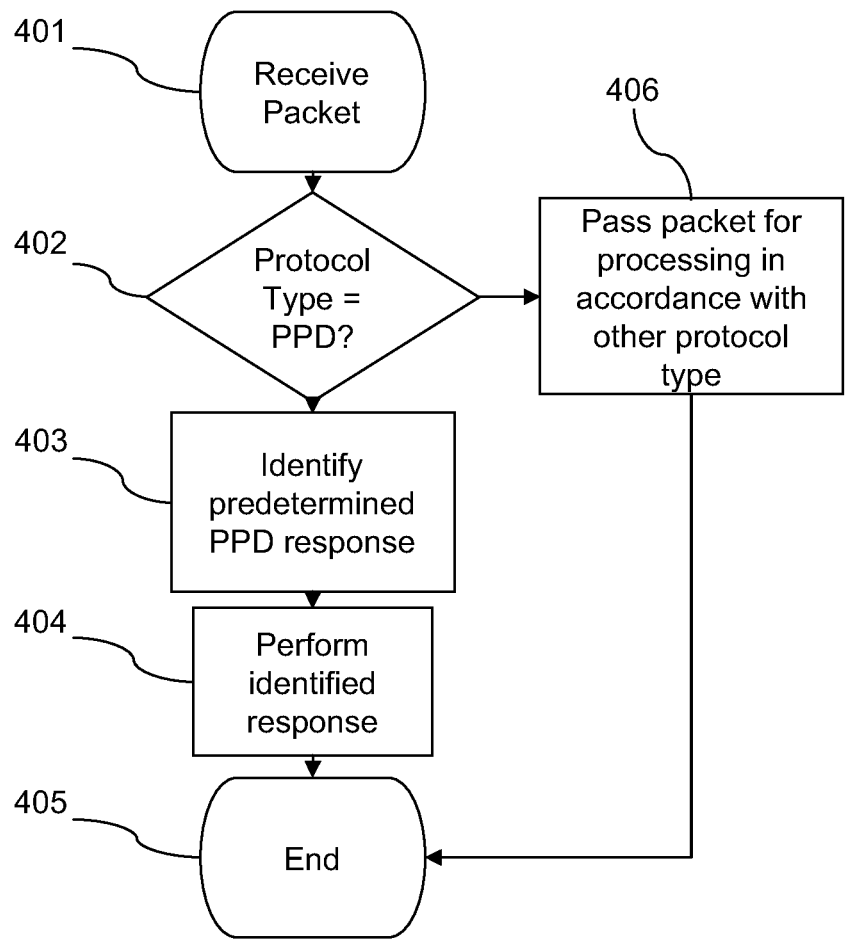
FIG. 4 is a flow chart illustrating the processing performed by a network node of FIG. 1 in response to the receipt of a packet according to FIG. 2.

The processing performed by a NIC 107 in response to the receipt of an ARP packet 201 comprising the PPD identifier 205 via an associated port 108 on a given network node 102, 103 will now be described with reference to the flow chart of FIG. 4. Processing is initiated at step 401 in response to the receipt of an ARP packet 201 and processing moves to step 402. At step 402 the protocol type (PTYPE) 204 of the received packet is inspected and if it corresponds to the PPD identifier 205 then processing moves to step 403. At step 403 the predetermined PPD response is identified from the NIC 107 settings and processing moves to step 404. At step 404 the predetermined response is performed so as to provide an indication identifying the port 108 via which the ARP packet 201 comprising the PPD identifier 205 was received. Processing then moves to step 405 and ends. If at step 402 the protocol type (PTYPE) 204 of the received packet is other than the PPD identifier 205 then processing moves to step 406 where the packet is passed for processing by other processes provided in the NIC 107 for such packets and then processing moves to step 406 and ends.

In another embodiment, the NIC on a network node is arranged to be remotely operable to send a PPD identifier on an identified port. Thus an engineer can instruct the NIC on any given network node from any physical location. For example, an engineer may be physically located at a node of interest and instruct one or more other nodes in a network to issue PPD identifiers on selected ports so as to identify each of the adjacent nodes to the node of interest.

In a further embodiment, the NIC is arranged to send PPD identifiers on one or more selected ports at a user-selected time or after a predetermined time delay.

As will be understood by those skilled in the art, any one or more input methods may be provided for instructing the NIC to send a PPD identifier on a selected port. For example, a CLI input method only may be provided or a switch only method may be provided.

In another embodiment a record of a received PPD identifier is stored in a log file in association with data representing the port on which the PPD identifier was received. Each log entry may comprise an appropriate timestamp.

As will be understood by those skilled in the art, a notification of the receipt of a PPD identifier at a given node may be accompanied by any further suitable information such as the physical location of the receiving port or identification of the sending node or port such as network address.

In another embodiment, the NIC is arranged to provide audible notifications of the receipt of a PPD identifier. Such audible notification may comprise tone or voice outputs and identify the relevant port that received the PPD identifier. For example, a tone repeated n times may be used to indicate the nth port as the receiving port for the PPD identifier. Other patterns of tones may be used for identifying the relevant port. Tones may be output for predetermined period or until manual cancellation.

In a further embodiment, one or more lights are provided on the generally visible side of a network node and used to indicate the receipt of a PPD identifier at ports located at a generally obscured part of the machine. For example, network switches installed in racks may be provided with a display on the front, exposed side while the network ports are provided on the back of the machine within the rack.

As will be understood by those skilled in the art, any suitable form of visual display or other communication means may be used to communicate the receipt of a PPD identifier at an associated network node.

In another embodiment, some network nodes have no facility for outputting a notification of the PPD packet being received and an indication of the receiving port. For example, a network node that converts the network signals from an electrical form to an optical form may have no facility for outputting such a notification. In this embodiment, the NICs on the relevant network nodes are arranged to identify a received a packet as a PPD packet and then to pass is to one or more adjacent network nodes without further processing. Such NICs may be arranged to send the packet to all adjacent network nodes. In the present embodiment, the PPD packet may be provided with a facility for governing the number of additional step that the packet may be transmitted. For example, a PPD packet may be arranged to carry a variable that is decremented by the relevant NIC each time the packet is received at a network node. Once the variable reaches a predetermined value, such as zero, the packet cannot be retransmitted. Packets that cannot be retransmitted at all have a variable with an initial value of zero.

Embodiments of the invention are arranged to enable the physical location of a network link, that is, the physical location of the connection between two physical network nodes as opposed to location within the network topology.

As will be understood by those skilled in the art, embodiments of the invention may be implemented for any type of network link and associated communications protocol. For example, suitable protocols may be provided from the OSI, TCP/IP or Fibre Chanel protocol stacks. A communication protocol that enables the identification of a suitable PPD identifier within packets or frames provides a suitable mechanism for embodiments of the invention.

The Address Resolution Protocol (ARP) is a request and reply protocol that runs encapsulated by a line protocol. The ARP is communicated within the boundaries of a single network. The ARP falls into the link layer of the TCP/IP protocol stack. In the OSI model, ARP is commonly described as residing between layers 2 and 3, being encapsulated by layer 2 protocols. As will be understood by those skilled in the art, embodiments of the invention are not restricted to encapsulated protocols or to specific protocols within any given layer of a relevant protocol stack.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for use in a communications source network node for identifying a destination port associated with a destination network node to which a selected network link is connected, said method comprising:
   receiving, by said source network node, a user's selection of a source port for interrogation as to the destination of the network link, wherein said user selection of said source port for interrogation comprises one of a predetermined command input via a user interface, and an operation of a switch associated with said source port;
   creating an address resolution layer (ARP) protocol packet and inserting a predetermined identifier of said source port as a protocol type;
   transmitting said protocol packet via said source port;
   receiving said protocol packet at said destination network node via said selected network link connected to said destination port associated with said destination network node;
   inspecting, by said destination network node, said protocol packet for said predetermined identifier; and
   if said predetermined identifier is present in said protocol packet then outputting an indication that said identifier has been received comprising an identification of said destination port via which said packet was received by illuminating a destination switch associated with said destination port, or by an output provided via a user interface of a network interface controller associated with said destination port.

2. A method according to claim 1 in which data representing said indication is recorded in a log file.

3. A method according to claim 1 in which said indication comprises an audible signal associated with said destination network node.

4. A method according to claim 1 in which said protocol comprises a data link layer protocol and said packet comprises a frame.

5. A method according to claim 1 in which said protocol comprises a link layer protocol.

6. A method according to claim 1 in which said destination network node is arranged to broadcast said received packet to each other adjacent network node and to omit the outputting of said indication.

7. A method according to claim 6 in which said packet comprises data arranged to determine the number of times said packet may be broadcast.

8. An apparatus for use in a communications network node for identifying a destination port associated with a destination network node to which a selected network link is connected, said apparatus being operable to:
   receive, by said source network node, a user's selection of a source port for interrogation as to the destination of the network link, wherein said user selection of said source port for interrogation comprises one of a predetermined command input via a user interface, and an operation of a switch associated with said source port;
   create an address resolution layer (ARP) protocol packet and inserting a predetermined identifier of said source port as a protocol type;
   transmit said protocol packet via said source port;
   receive said protocol packet at said destination network node via said selected network link connected to said destination port associated with said destination network node;
   inspect, by said destination network node, said protocol packet for said predetermined identifier; and
   if said predetermined identifier is present in said protocol packet then output an indication that said identifier has been received comprising an identification of said destination port via which said packet was received by illuminating a destination switch associated with said destination port, or by an output provided via a user interface of a network interface controller associated with said destination port.

9. The apparatus according to claim 8 in which data representing said indication is recorded in a log file.

10. The apparatus according to claim 8 in which said indication comprises an audible signal associated with said destination network node.

11. The apparatus according to claim 8 in which said protocol comprises a data link layer protocol and said packet comprises a frame.

12. The apparatus according to claim 8 in which said network node is arranged to broadcast said received packet to each other adjacent network node and to omit the outputting of said indication.

13. The apparatus according to claim 12 in which said packet comprises data arranged to determine the number of times said packet may be broadcast.

14. A computer program product for use in a communications source network node for identifying a destination port associated with a destination network node to which a selected network link is connected, the computer program product comprising a non-transitory computer-readable storage medium having computer-readable program code embodied therewith, the computer-readable program code being configured to:
   receive, by said source network node, a user's selection of a source port for interrogation as to the destination of the network link, wherein said user selection of said source port for interrogation comprises one of a predetermined command input via a user interface, and an operation of a switch associated with said source port;

create an address resolution layer (ARP) protocol packet and inserting a predetermined identifier of said source port as a protocol type;

transmit said protocol packet via said source port;

receive said protocol packet at said destination network node via said selected network link connected to said destination port associated with said destination network node;

inspect, by said destination network node, said protocol packet for said predetermined identifier; and if said predetermined identifier is present in said protocol packet then output an indication that said identifier has been received comprising an identification of said destination port via which said packet was received by illuminating a destination switch associated with said destination port, or by an output provided via a user interface of a network interface controller associated with said destination port.

* * * * *